Dec. 3, 1946.   C. J. LUNDBORG   2,412,163
ELECTRIC CONTROL
Original Filed Jan. 21, 1942   2 Sheets-Sheet 1
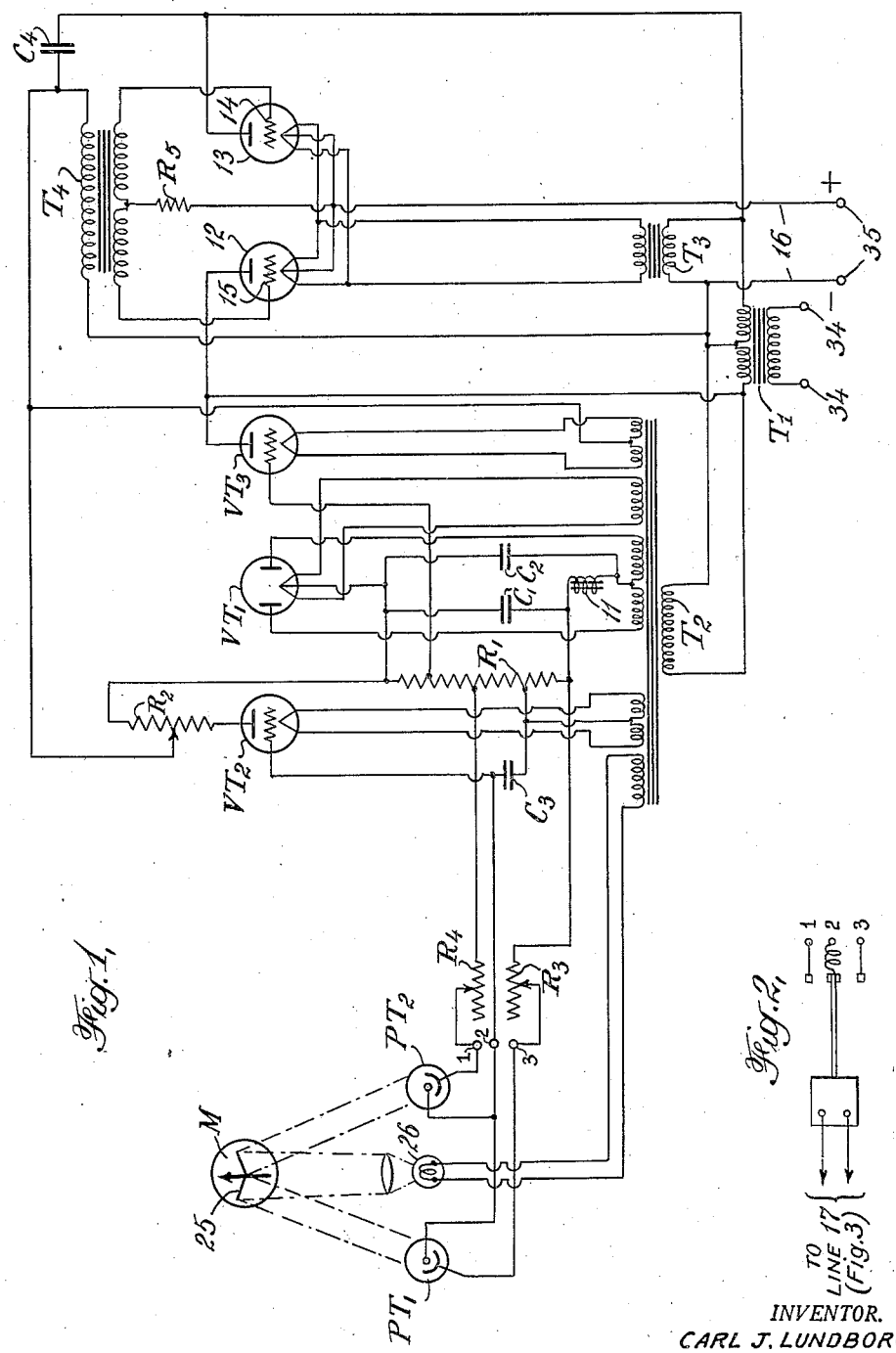
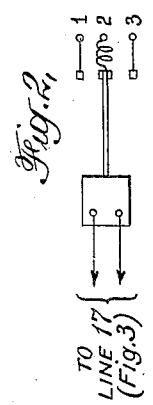
INVENTOR.
CARL J. LUNDBORG
BY
Pennie, Davis, Marvin and Edmonds
ATTORNEYS Patented Dec. 3, 1946

2,412,163

UNITED STATES PATENT OFFICE 2,412,163

ELECTRIC CONTROL

Carl J. Lundborg, Great Falls, Mont.

Original application January 21, 1942, Serial No. 427,567. Divided and this application February 22, 1944, Serial No. 523,450

10 Claims. (Cl. 315—198)

The present invention relates to electric control circuits, and, more particularly, to electric control circuits involving control of the output of grid control rectifiers. The invention, while being of general applicability, is especially applicable to control of the total load imposed by a plurality of independent loads upon a common source of electric power.

This application is a division of my U. S. application Ser. No. 427,567, filed January 21, 1942, now Patent No. 2,362,652. Numerous operations involving the use of electric apparatus call for a control device which will effect a desired variation in the operation of the electric apparatus. For example, in the operation of a plant using electric power for various purposes such as for electrolytic cells, a rolling mill, tram system, etc., it is frequently desirable to maintain the total power used in the plant at a substantially constant value. This may be accomplished if means are provided for controlling the power absorbed by one of the loads so as to maintain the total power consumed at a predetermined desired value or rate, particularly when the power is paid for on the basis of a peak load rate. In a plant such as that referred to above wherein the power absorbed by such units as the rolling mill, tram system, etc., is variable, but cannot be controlled at will because of the demand nature of these loads, the electrolytic cells represent a load which may be economically varied substantially at will and in such manner that the total amount of power consumed by all loads in the plant remains substantially constant at the peak load value, or at any other desired value. The present invention provides a control circuit capable of thus maintaining a substantially constant power consumption in such a plant, particularly by control of the power absorbed by the electrolytic cells, although the invention is applicable to many other operations in which control of the combined output of a plurality of grid control rectifiers may be utilized for control of electric apparatus.

The control circuit of my invention for regulating the combined output of a plurality of grid control rectifiers comprises a plurality of grid control rectifiers interconnected to combine the outputs of the individual rectifiers, means for providing the grids of the rectifiers with a potential having a predetermined phase relationship with the potential of the plates of the rectifiers, and means including relay means controlling or regulating the phase relationship between the grid and plate potentials of at least one of the rectifiers in such manner as to control the combined outputs of the interconnected rectifiers. The phase relationship between the grid and plate potentials of the rectifiers is advantageously such as to obtain a substantially intermediate output from each of the rectifiers, and the phase relationship between the grid and plate potentials of at least one of the rectifiers is regulated by a variable superposed potential responsive to the variation in an electric apparatus which it is desired to control.

These and other features of the invention will be more fully understood by reference to the accompanying drawings, in which—

Fig. 1 is a circuit diagram of an apparatus embodying the invention;

Fig. 2 shows one form of contact assembly that may be used in the circuit illustrated in Fig. 1.

Figure 3:
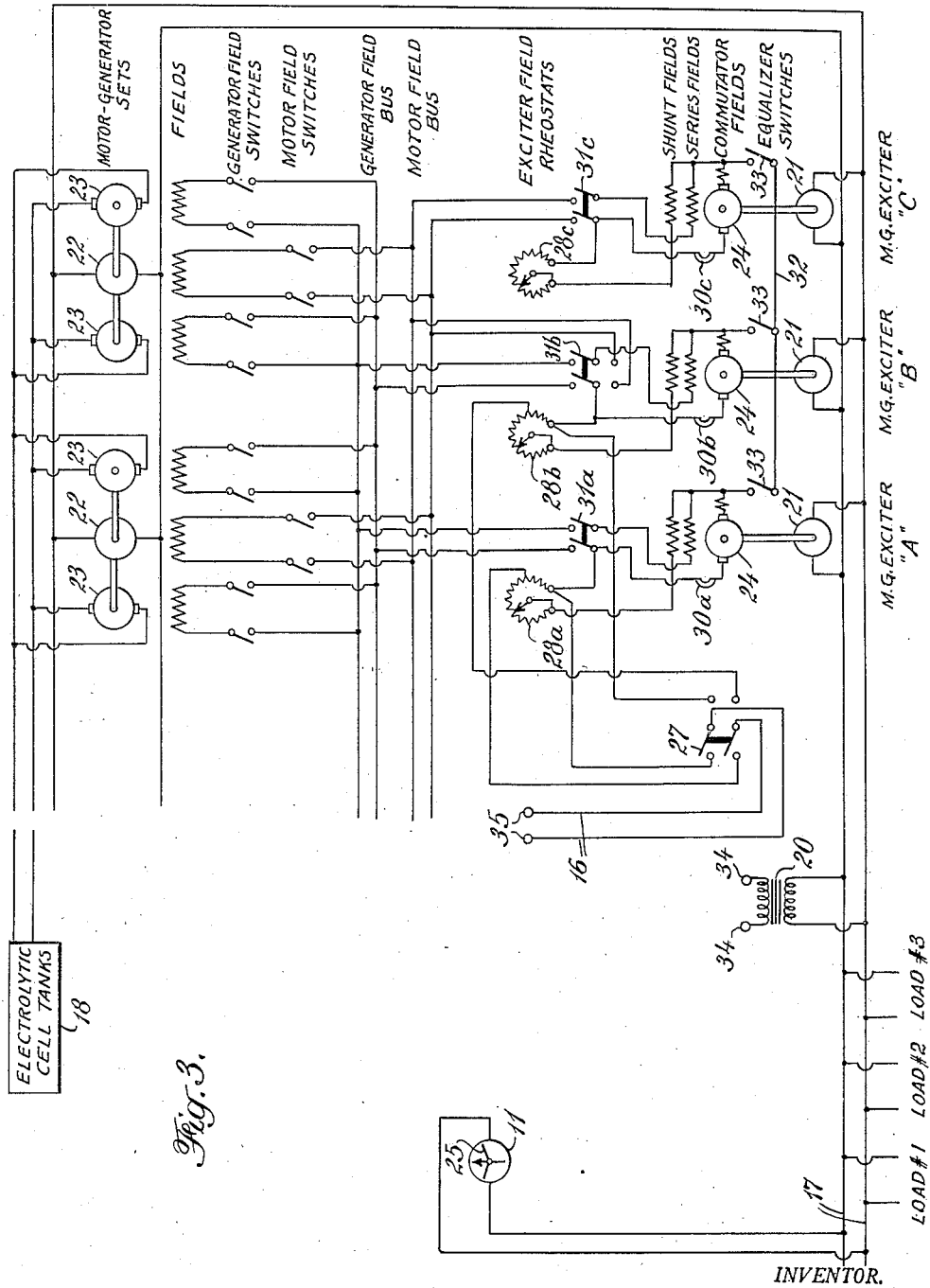
Fig. 3 is a circuit diagram showing one application of the control circuit of my invention to control of the power absorption in an illustrative plant arrangement, this figure being drawn as a continuation of Fig. 1.

Referring to Fig. 1 of the drawings, $T_1$ represents a transformer for supplying power for the control circuit. A second transformer $T_2$ is connected across the center tap and one end of the secondary of transformer $T_1$ and supplies power for the operation of the three thermionic tubes $VT_1$, $VT_2$ and $VT_3$ and the circuits appurtenant thereto. The tube $VT_1$ comprises a full wave rectifying tube connected across a secondary of the transformer $T_2$. The direct potential output of the tube $VT_1$, which is filtered through the circuit including the choke coil 11 and the condensers $C_1$ and $C_2$, is connected across the resistance $R_1$ which serves as a voltage divider impedance. The positive side of the voltage divider $R_1$ is connected through another impedance comprising the resistor of potentiometer $R_2$ to the plate of the vacuum tube $VT_2$. The negative side of the voltage divider $R_1$ is connected through the variable resistance $R_3$ and the photoelectric cell $PT_1$ to the grid of the tube $VT_2$. The cathode of the tube $VT_2$ is connected to the voltage divider $R_1$ at a point positive with respect to the negative side of the voltage divider, and the cathode and grid of the tube $VT_2$ are interconnected through a condenser $C_3$. The grid of the tube $VT_2$ is also connected through the photoelectric tube $PT_2$ and the variable resistance $R_4$ to a point on the voltage divider $R_1$ which is positive with respect to the point on $R_1$ to which the cathode of the tube $VT_2$ is connected. Thus, the photoelectric cell $PT_1$ is in a circuit which connects the grid of the tube VT₂ to a source of negative potential and the photoelectric cell PT₂ is in a circuit which connects the grid of the tube VT₂ to a source of positive potential.

In the operation of this portion of the control circuit, light falling with equal distribution from a source hereinafter described, upon the photoelectric cells PT₁ and PT₂ permits current to flow in the two circuits including the photoelectric cell PT₁ and the resistance R₃ and including the photoelectric cell PT₂ and the resistance R₄, respectively, thus tending to balance the negative and positive potentials imposed on the grid of the tube VT₂ controlled by these two circuits. Under these conditions current will flow through the tube VT₂. When, however, the distribution of light intensity on the two photoelectric cells is such that more light falls upon PT₂ than on PT₁, the conductivity of the photoelectric cell PT₂ is greater than that of the cell PT₁ and consequently a less negative potential is imposed on the grid of the tube VT₂. The speed with which this change in light distribution between the two photoelectric cells is reflected by the change in grid potential in the tube VT₂ is controlled, with any given capacity for the condenser C₃, by the values of the variable resistances R₃ and R₄. By the proper selection of the values of the resistances R₃ and R₄, any rapid oscillation or fluctuation in the light distribution between the two photoelectric cells is substantially completely damped and does not result in a corresponding oscillation of the grid potential of the tube VT₂. This is true of both types of relay means here disclosed, viz., the photoelectric cell type of Fig. 1, and the mechanical type of Fig. 2, later to be described. As the potential of the grid of the tube VT₂ becomes more positive the current flowing through this tube increases. An increase in the negative bias of the grid of the tube VT₂, resulting from more light falling on the photoelectric cell PT₁ than on the cell PT₂, decreases the tube current flowing through the tube VT₂.

The vacuum tube VT₃ acts as an electronic valve. The grid of the tube VT₃ is connected to the voltage divider R₁ at a point negative with respect to the positive end of the voltage divider. The center tap of the cathode of the tube VT₃ is connected to the sliding contact of the potentiometer R₂. Accordingly, the bias voltage on the grid of tube VT₃ is the difference between the voltage drop on the voltage divider R₁ from its positive end to the point at which the grid of VT₃ is connected and the voltage drop in the potentiometer R₂ between the positive end of voltage divider R₁ and the sliding contact of the potentiometer. By adjusting the position of the sliding contact on the potentiometer to give a negative bias to the grid of VT₃ when the tube current of VT₃ is normal, an increase in the tube current of VT₂ will produce a greater voltage drop in the potentiometer R₂, thus decreasing the negative grid bias in the tube VT₃. With a decrease in the negative bias on the grid of the tube VT₃, the tube current flowing through the tube VT₃ increases. Thus, with more light falling on the photoelectric cell PT₂ than on the cell PT₁, the tube current through VT₂ increases and the tube current through VT₃ also increases, whereas a reversal of this light distribution causes a decrease in the tube currents of both VT₂ and VT₃.

The grid control rectifier circuit providing the controlled power output for the desired regulation of an electric apparatus includes two gas-filled grid control rectifiers, or "Thyratrons," 12 and 13. The filaments of the rectifiers are supplied from a filament transformer T₃ connected across one-half of the secondary of the transformer T₁. The plates of the rectifiers 12 and 13 are connected across the ends of the transformer T₁ secondary. An auxiliary circuit comprising the condenser C₄ and the primary of the transformer T₄ is connected between the plate of the rectifier 13 and the center tap of the transformer T₁ secondary. The grid 14 of the rectifier 13 and the grid 15 of the rectifier 12 are connected across the ends of the secondary winding of the transformer T₄. The auxiliary circuit causes a potential to be impressed on the grids 14 and 15 having a definite phase relationship with the plate potentials of the rectifiers 13 and 12, respectively. The magnitude of the grid current of the rectifiers is limited by the resistance R₅ connected between the center tap of the transformer T₄ secondary and the cathodes of both rectifiers. The plate of the vacuum tube VT₃ is connected to the same end of the transformer T₁ secondary as is the plate of the rectifier 12, and the cathode of the tube VT₃ is connected to the auxiliary circuit at a point common to the condenser C₄ and the end of the primary of transformer T₄, remote from the end connected to the center tap on transformer T₁, completing the plate circuit of tube VT₃. Thus, the variable plate current flowing through the vacuum tube VT₃ and entering the auxiliary circuit between the condenser C₄ and the primary of the transformer T₄, acting as a variable superposed potential substantially out of phase with the grid potentials of the rectifiers 12 and 13, alters the phase relationship between the grid and plate potentials of the rectifiers 12 and 13 (and also modifies the effective amplitudes of the grid potentials). These changes in phase relationship effect corresponding changes in unidirectional output current from rectifiers 12 and 13. The output current from the interconnected rectifiers 12 and 13 is obtained through line 16 comprising connections to the center tap of the transformer T₁ secondary and to the center taps of the interconnected cathodes of these rectifiers.

This embodiment of the invention may be applied, as shown in Fig. 3, to the maintenance of the power consumption of a plant including an electrolytic cell tank room, Fig. 3 being drawn as a continuation of Fig. 1, terminals 34 and 35, respectively, of both figures being identical. The various independent power consuming loads may comprise rolling mills, smelters, tram systems, compressors, and the like, and are represented in Fig. 3 by loads #1, #2 and #3 connected across the power line 17. To simplify the diagram this power line is shown as comprising but two wires, but a multi-phase line is usually employed in such plants. Variations in the power absorbed by these loads are automatically compensated by control, in accordance with the present invention, of the power consumed by the electrolytic cell tanks 18. The power transformer 20 is connected to the power line 17 and through terminals 34 to the primary of transformer T₁ of Fig. 1 and supplies to the primary of the transformer T₁ power necessary for the operation of the control circuit shown in Fig. 1. Also connected to the power line 17 are the motors 21 of the motor-generator exciters "A," "B" and "C" and the motors 22 of the plurality of motor-generator sets which supply direct current power to the electrolytic cell tanks 18. The field excitation for the motors 22 and generators 23 of these motor-generator sets is provided by the generators 24 of the motor-generator exciters "A," "B" and "C."

The power meter M (shown generally) is connected in known manner to the power line 17 in order to indicate the total power consumed by the entire plant. The meter M which is provided with a divided mirror 25, is connected to the power line in such manner that a drop in the plant power consumption below the desired rate of power consumption causes the light from a suitable light source 26 to be reflected from the mirror 25 with greater intensity on the photoelectric cell $PT_2$ than on the cell $PT_1$ of the control circuit illustrated in Fig. 1. This causes an increase in tube current through the vacuum tube $VT_2$, and a corresponding increase in the output of the interconnected rectifiers 12 and 13 through lines 16. The output of the interconnected rectifiers 12 and 13 through terminals 35 in lines 16, as shown in Figs. 1 and 3, is connected to the double throw switch 27. By means of the switch 27 the output of the interconnected rectifiers 12 and 13 may be connected across a portion of either of the field rheostats 28a and 28b which are connected in series with the shunt fields of the generators 24 of the motor-generator exciters "A" and "B," respectively. The current output of the interconnected rectifiers 12 and 13 is supplied to field rheostat 28a or 28b in such manner that an increase in output current increases the total current flowing through the shunt field of either of the generators 24 of exciters "A" and "B" thus tending to increase the output of these exciters which in turn increases the output of generators 23, thus increasing the load on motors 22 and therefore on power line 17.

It will be noted that the output of the interconnected rectifiers through lines 16 is connected into the shunt field circuit of the motor-generator exciter "A" or "B" by taps onto the field rheostat 28a or 28b so that the current output through lines 16 flows through a portion of either rheostat acting as a fixed resistance in the shunt field circuit of each exciter. However, this is primarily a connection in the interest of convenience and accordingly the lines 16 may instead be connected across a separate fixed resistance in the shunt field circuit of either exciter "A" or "B." The control circuit supplying the current output through the lines 16 is advantageously operated in such manner that under normal conditions (i. e., when an equal light distribution falls on the photoelectric cells $PT_1$ and $PT_2$) the current output from the interconnected rectifiers of the control circuit provides at least a substantial portion of the current flowing through the shunt field of the generator 24.

The output from the generator 24 of the motor-generator exciter "A" is connected through its series field, the circuit breaker 30a and the switch 31a to the bus supplying excitation to the fields of the generators 23. The output from the generator 24 of the motor-generator exciter "B" is connected through its series field and the circuit breaker 30b to a double-throw switch 31b which is adapted to supply the output of exciter "B" either to the bus for the fields of the generators 23 or to the bus for the fields of the motors 22. The output from the generator 24 of exciter "C" is connected through the circuit breaker 30c and the switch 31c to the bus for the fields of the motors 22. Thus, complete flexibility is afforded for utilizing the controlled current output from the control circuit in varying the power output from the generators 23 to the electrolytic cell tanks 18 by means of variations in the field excitation of either the generators or motors of the motor-generator sets. Uniformity in operation and output of the exciters "A," "B" and "C" is enhanced by the equalizing connection between each of the exciter generators 24 comprising the line 32 and the equalizer switches 33. Inasmuch as the power output of the generators 23 to the electrolytic cell tanks 18 represents converted power obtained from the power line 17, variations in the power supplied to the electrolytic cell tanks represent variations in the power consumed by this load on the power line.

The control circuit of my invention has many advantages over control circuits proposed or used heretofore. When the variable resistances $R_3$ and $R_4$ are adjusted to give the proper time constants to the circuit including the condenser $C_3$, there is substantially no hunting and the operation of the control circuit is smooth and uniform. The design of the control circuit is also such that once it is calibrated and adjusted to give the desired control output this calibration is not disturbed by subsequent changes in the operating constants of the tubes. The accuracy and sensitivity of the control circuit are to some extent dependent upon the relay system used to translate to the rest of the control circuit the electrical variation to be controlled. Where photoelectric cells are used as such a relay, as shown in the specific embodiment of the invention illustrated in Fig. 1, no moving contacts are involved and the output of the control circuit is directly responsive to the distribution of light intensity on the two photoelectric cells, thus giving a proportional step control. The photoelectric cells $PT_1$ and $PT_2$ may be so illuminated that only one or the other of these cells is illuminated when the meter reading is either above or below its normal position. Where a contact relay such as that shown in Fig. 2 is used in place of the photoelectric cells (the connections to the control circuit represented by the numerals 1, 2 and 3 being the same as in Fig. 1), the contact relay may be of a very delicate design because the currents passing between the contacts, being substantially only the grid current in the tube $VT_2$, are of the order of microamperes. The range of the control circuit (regardless of the type of relay used) is readily adjusted to meet any conditions by regulation of the potentiometer $R_2$ which determines the magnitude of the grid bias of the tube $VT_3$.

The control circuit of the invention may be used in any electric system wherein control of the system may be effected by a variable direct current comprising the output of the interconnected rectifiers. For example, the control circuit may be used to effect voltage regulation of an A. C. or D. C. generator, or for supplying part or all of the field excitation of a D. C. motor, or for supplying all or part of both field and armature current of a D. C. motor as a means of speed and torque control of the motor. The control circuit may also be used to regulate current in an A. C. circuit by supplying the direct current output of the control circuit to a D. C. winding of a saturable core reactor in the A. C. circuit. Thus, the control circuit may be used with advantage in any service wherein a variable but controlled direct current, within the current capacity of the rectifier tubes, may be utilized, and it is in this broad sense that the claims refer to control in response to changes in a given load.

What is claimed is:

1. In a system for automatically controlling the output of a gas-filled rectifier in accordance with changes in a given load, said rectifier having a control grid, means for providing said control grid with a potential having a predetermined phase relation with the potential of the plate thereof, a vacuum tube having a grid, a grid circuit, a cathode, a plate and a plate circuit, means in said plate circuit for deriving a control potential therein, coupling means linking said plate circuit with the control grid of said rectifier for automatically varying said phase relation in accordance with variations in said control potential, and means for effecting variations in said control potential in response to changes in said load, including: relay means, means for automatically actuating said relay means in accordance with a preselected change in said given load, a source of substantially constant biasing potential, and connections between said relay means, the grid of said vacuum tube and said source of biasing potential, said change in given load effecting a corresponding change in the biasing potential impressed on the grid of said vacuum tube to vary the output of said rectifier in accordance with said changes in said given load.

2. In a system for automatically controlling the output of a gas-filled rectifier in accordance with changes in a given load, said rectifier having a control grid, means for providing said control grid with a potential having a predetermined phase relation with the potential of the plate thereof, a vacuum tube having a grid, a grid circuit, a cathode, a plate and a plate circuit, means in said plate circuit for deriving a control potential therein, coupling means linking said plate circuit with the control grid of said rectifier for automatically varying said phase relation in accordance with variations in said control potential, and means for effecting variations in said control potential including: relay means, means responsive to said changes in said given load for actuating said relay means in accordance with a preselected change in said given load, a source of substantially constant biasing potential, connections between said relay means, the grid of said vacuum tube and said source of biasing potential, said change in given load effecting a corresponding change in the biasing potential impressed on the grid of said vacuum tube to vary the output of said rectifier in accordance with said changes in said given load, and means connected in at least one of said connections for predetermining the time constant of the grid circuit of said vacuum tube.

3. In a system for automatically controlling the output of a gas-filled rectifier in accordance with changes in a given load, said rectifier having a control grid, means for providing said control grid with a potential having a predetermined phase relation with the potential of the plate thereof, a vacuum tube having a grid, a grid circuit, a cathode, a plate and a plate circuit, means in said plate circuit for deriving a control potential therein, coupling means linking said plate circuit with the control grid of said rectifier for automatically varying said phase relation in accordance with variations in said control potential, and means for effecting variations in said control potential including: relay means, means responsive to said changes in said given load for actuating said relay means in accordance with a preselected change in said given load, a source of substantially constant biasing potential, a first connection from said relay means to the grid of said vacuum tube, and a second connection from said relay means to said source of biasing potential, said change in given load effecting a corresponding change in biasing potential impressed on the grid of said vacuum tube to vary the output of said rectifier in accordance with said changes in said given load, adjustable means in one of said connections for adjusting the value of biasing potential impressed on said last named grid, and means including said adjustable means for predetermining the time constant of the grid circuit of said vacuum tube.

4. In a system for automatically controlling the output of a gas-filled rectifier in accordance with changes in a given load, said rectifier having a control grid, means for providing said control grid with a potential having a predetermined phase relation with the potential of the plate thereof, a vacuum tube having a grid, a grid circuit, a cathode, a plate and a plate circuit, means in said plate circuit for deriving a control potential therein, coupling means linking said plate circuit with the control grid of said rectifier for automatically varying said phase relation in accordance with variations in said control potential, and means for effecting variations in said control potential including: relay means, means responsive to said changes in said given load for actuating said relay means in accordance with a preselected change in said given load, a coupling between the grid of said vacuum tube and said relay, a source of substantially constant potential comprising a voltage dividing resistor through which a substantially constant unidirectional current flows, a coupling from the plate of said vacuum tube to the positive terminal of said resistor, a first connection from the cathode of said vacuum tube to a first point on said resistor considerably more negative than said positive terminal, a second connection from said relay means to a second point on said resistor more negative than said first point, a third connection from said relay means to a third point on said resistor more positive than said first point, a variable resistor in at least one of said second and third connections and a condenser effectively connected between the grid and cathode of said vacuum tube whereby the time constant of the grid circuit thereof is predetermined and said change in said given load effects a corresponding change in the biasing potential impressed on the grid of said vacuum tube so that the output of said rectifier is varied in accordance with said changes in said given load.

5. A system according to claim 4 wherein said coupling means linking said plate circuit with the control grid of said rectifier includes a second vacuum tube having a cathode, a grid and a plate, said last named grid being connected to a fourth point on said resistor less positive than said terminal, impedance means in the plate circuit of said first vacuum tube across which is developed said control potential which fluctuates in response to changes in said load, means for impressing said control potential on the cathode of said second vacuum tube, and an impedance connected in the grid circuit of said rectifier, the cathode and plate of said second vacuum tube being effectively coupled across said impedance, whereby the grid-to-plate phase relation of said rectifier is automatically varied in accordance with variations in said control potential.

6. In a power control system, a pair of gas-filled grid control rectifier tubes coupled in full-wave rectifier relation, a first vacuum tube having grid and plate circuits and a cathode, the plate circuit thereof being coupled to the grids of said rectifier tubes so that variation of current in said plate circuit varies the phase relation between the grid and plate potentials of said rectifier tubes, a second vacuum tube having a grid, a cathode, a plate, and a plate circuit, impedance means connected in the plate circuit of said second tube in series between the plate and the cathode thereof, a source of direct-current potential connected with its negative terminal to a first point on said impedance means and its positive terminal to a second point on said impedance means, the cathode of said second tube being connected to a third point on said impedance means between said first and second points, a connection from the cathode of said first tube to a fourth point on said impedance means between said second point and the plate of said second tube, a fifth point on said impedance means more positive than said third point and a sixth point on said impedance means more negative than said third point, relay means for impressing on the grid of said second tube a control potential derived from the potential at either of said fifth and sixth points, and means responsive to fluctuations in said power source for actuating said relay means so that the output of said rectifiers is varied in accordance with said fluctuations.

7. In a power control system, a pair of gas-filled grid control rectifier tubes coupled in full-wave rectifier relation, a first vacuum tube having grid and plate circuits and a cathode, the plate circuit thereof being coupled to the grids of said rectifier tubes so that variation of current in said plate circuit varies the phase relation between the grid and plate potentials of said rectifier tubes, a second vacuum tube having a grid, a cathode, a plate, and a plate circuit, impedance means connected in the plate circuit of said second tube, means causing a unidirectional current to flow through said impedance means, a connection from said impedance means to the cathode of said first tube, a connection from the grid of said first tube to a point in the plate circuit of said second tube normally more negative than said connection from said impedance means, a source of substantially constant potential normally negative with respect to the grid of said second tube, a source of substantially constant potential normally positive with respect to the grid of said second tube, relay means for impressing on the grid of said second tube a control potential derived from at least one of said potential sources, and means coupling said relay means with a power source, said coupling means being responsive to fluctuations in said power source to actuate said relay means to vary the output of said rectifiers in accordance with said fluctuations.

8. A system according to claim 7, wherein said sources of substantially constant negative and positive potentials comprise taps on a voltage divider resistance and connections therefrom to said relay means.

9. In a system for automatically controlling the output of a gas-filled rectifier in accordance with changes in a given load, said rectifier having a control grid, means for providing said control grid with a potential having a predetermined phase relation with the potential of the plate thereof, a vacuum tube having a grid, a grid circuit, a cathode, a plate and a plate circuit, means in said plate circuit for deriving a control potential therein, coupling means linking said plate circuit with the control grid of said rectifier for automatically varying said phase relation in accordance with variations in said control potential, and means for effecting variations in said control potential in response to changes in said load, including: relay means, means for automatically actuating said relay means in accordance with a preselected change in said given load, a source of substantially constant biasing potential, and connections between said relay means, the grid of said vacuum tube and said source of biasing potential, said change in given load effecting a corresponding change in the biasing potential impressed on the grid of said vacuum tube to vary the output of said rectifier inversely with respect to said changes in said given load.

10. In a power control system, a pair of gas-filled grid control rectifier tubes coupled in full-wave rectifier relation, a first vacuum tube having grid and plate circuits and a cathode, the plate circuit thereof being coupled to the grids of said rectifier tubes so that variation of current in said plate circuit varies the phase relation between the grid and plate potentials of said rectifier tubes, a second vacuum tube having a grid, a cathode, a plate, and a plate circuit, impedance means connected in the plate circuit of said second tube, means causing a unidirectional current to flow through said impedance means, a connection from said impedance means to the cathode of said first tube, a connection from the grid of said first tube to a point in the plate circuit of said second tube normally more negative than said connection from said impedance means, a source of substantially constant potential normally negative with respect to the grid of said second tube, a source of substantially constant potential normally positive with respect to the grid of said second tube, relay means for impressing on the grid of said second tube a control potential derived from at least one of said potential sources, and means coupling said relay means with a power source, said coupling means being responsive to fluctuations in said power source to actuate said relay means to vary the output of said rectifiers inversely with respect to said fluctuations.

CARL J. LUNDBORG.